United States Patent [19]

Willinger

[11] 4,369,216
[45] Jan. 18, 1983

[54] ARTIFICIAL AQUARIUM PLANT

[75] Inventor: Allan H. Willinger, Englewood, N.J.

[73] Assignee: Willinger Bros., Inc., Englewood, N.J.

[21] Appl. No.: 305,475

[22] Filed: Sep. 25, 1981

Related U.S. Application Data

[63] Continuation-in-part of Ser. No. 207,342, Nov. 17, 1980, Pat. No. 4,340,625.

[51] Int. Cl.³ .......................... A41G 1/00; A47G 7/00
[52] U.S. Cl. .................................... 428/17; 248/27.8; 428/23
[58] Field of Search .............................. 428/17, 23, 26; 47/40.5; 119/5; 248/27.8

[56] References Cited

U.S. PATENT DOCUMENTS

| | | | |
|---|---|---|---|
| 3,050,619 | 8/1962 | Abramson | 428/23 X |
| 3,573,142 | 3/1971 | Chidgey et al. | 428/17 |
| 3,576,698 | 4/1971 | Chidgey et al. | 428/17 |
| 3,682,753 | 8/1972 | Willinger | 428/23 X |
| 3,744,454 | 7/1973 | Willinger et al. | 428/17 X |
| 3,831,398 | 8/1974 | Davis, Sr. | 428/23 X |

FOREIGN PATENT DOCUMENTS

| | | | |
|---|---|---|---|
| 1024152 | 3/1966 | United Kingdom | 428/26 |
| 2021371 | 12/1979 | United Kingdom | 428/17 |

Primary Examiner—Henry F. Epstein
Attorney, Agent, or Firm—Goodman & Teitelbaum

[57] ABSTRACT

An artificial aquarium plant having a base member with a plurality of nestingly interfitting plant members supported by the base member. A coupling arrangement is provided for interconnecting the plant members with the base member. The plant members each include a body portion with branches upwardly extending from the body portion. Aligning members are included on the body portions for interfitting the body portions in an aligned orientation.

19 Claims, 11 Drawing Figures

ARTIFICIAL AQUARIUM PLANT

RELATIONSHIP TO OTHER APPLICATIONS

This application is a continuation-in-part application of Ser. No. 207,342 filed on Nov. 17, 1980 now U.S. Pat. No. 4,340,625 for an Artificial Aquarium Plant, the entire application of which is herein incorporated by reference.

BACKGROUND OF THE INVENTION

This invention relates to aquarium plants and more particularly to an artificial aquarium plant with readily assembled parts.

Artificial aquarium plants are utilized in order to decorate an aquarium so as to provide a natural appearance to the aquarium as well as to provide protection for small and newly hatched fish in the aquarium, such an artificial aquarium plant being disclosed in U.S. Pat. No. 3,682,753. While many such plants are readily available, it is generally desirable to provide the aquarium plants in a manner that they can be easily assembled both for display on a shelf as well as for utilization within the aquarium itself.

The particular size of the aquarium plant will often vary depending on the size of the tank in which it is utilized. It would be desirable to have a plant consisting of parts which can be assembled to any desired height and size to thereby avoid the necessity of having each sized plant uniquely constructed.

In some cases, the particular aquarium plant is designed to provide foliage on only one side, and when providing a plant which can be assembled, it is necessary to have such assembly accomplished in a manner whereby the foliage will be aligned in a particular desired aesthetic manner.

By making the plant of separate parts which can be assembled together, there is required the additional necessity for maintaining the assembly in a secure, firm and stable manner so that the artificial aquarium plant will not come apart during shipping, display or actual use. If desired, the parts of the plant can be shipped or stored separately to save space and reduce the costs in connection therewith.

SUMMARY OF THE INVENTION

Accordingly, it is an object of the present invention to provide an artificial aquarium plant which avoids the aforementioned problems of prior art devices.

Still another object of the present invention is to provide an artificial aquarium plant which comprises various sections which can be assembled together for display as well as for actual utilization in the aquarium tank.

A further object of the present invention is to provide an artificial aquarium plant which can be assembled in any desired height and size, in order to accommodate the needs within a particular aquarium tank.

Yet another object of the present invention is to provide an artificial aquarium plant which can be easily assembled in an aligned position so as to orient the foliage of the plant in a desired aesthetic appearance.

Still a further object of the present invention is to provide an artificial aquarium plant formed of plastic materials which can be easily assembled while providing an upstanding rigid appearance.

In accordance with the present invention, there is provided an artificial aquarium plant having a base member with a plurality of nestingly interfitting plant members supported by the base member. A coupling mechanism is provided for interconnecting the plant members together with the base member.

In accordance with a feature of the present invention, each of the plant members includes a body portion with branches upwardly extending from the body portion. There is further provided alignment devices on the various body portions for interfitting each body portion into the next sequential body portion in a desired aligned orientation so that the body portions are connected together. In this manner, by means of the alignment devices, the branches can be cooperatively oriented in overlapping layered relationship to provide a desired aesthetic appearance.

The particular coupling mechanism includes a leg depending from the body portion of the innermost plant member which passes through the body portions of the other subsequent plant members and extends into a slot formed in a bottom wall section of the base member. A transverse foot at the distal end of the leg locks beneath the bottom wall section when the plant members are twisted relative to the base member. A suitable seat can be provided for retaining the transverse foot locked in position beneath the bottom wall section.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

In the various figures of the drawing, like reference characters designate like parts.

DETAILED DESCRIPTION OF THE PREFERRED EMBODIMENT

Figure 1:
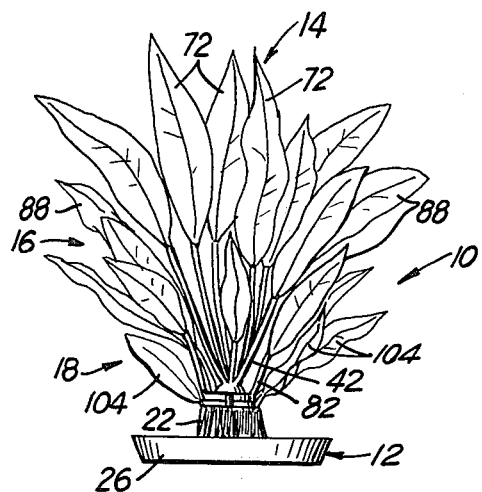
FIG. 1 is an elevational view of an artificial aquarium plant in accordance with the present invention, being shown in an assembled condition.
Figure 2:
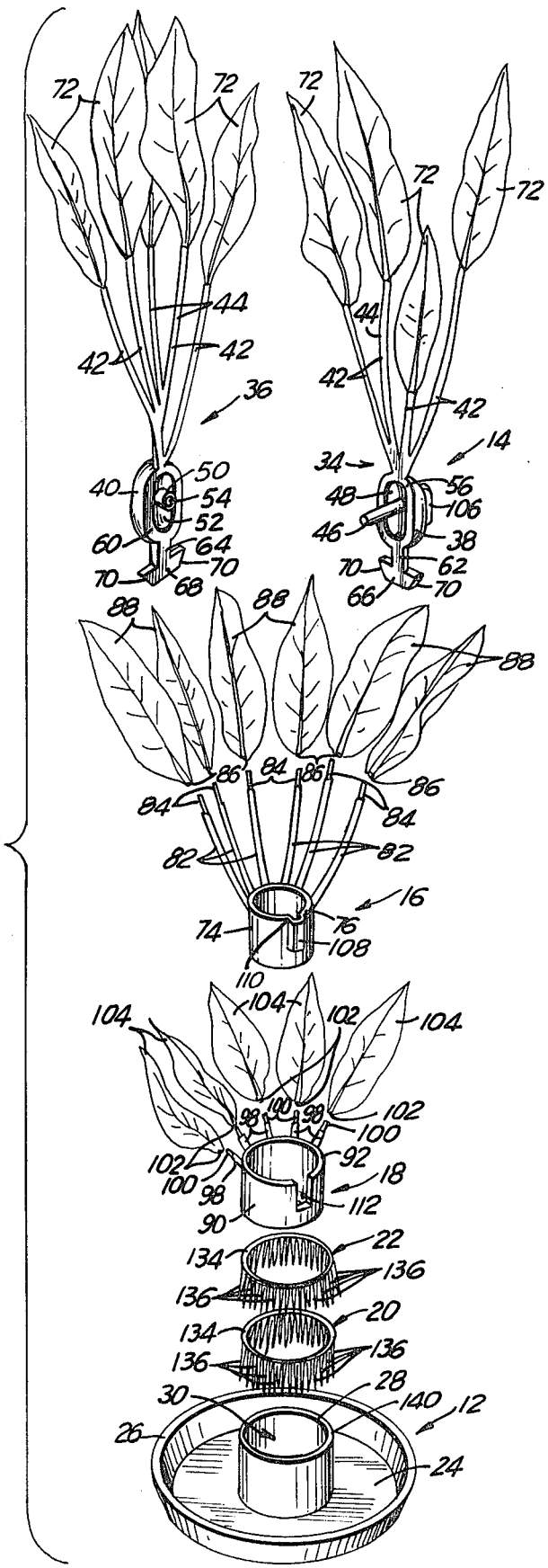
FIG. 2 is an exploded perspective view of the plant of the present invention.

Referring now to the drawings, particularly FIGS. 1 and 2, the artificial aquarium plant in accordance with the present invention is shown generally at 10 and is formed of a base member, shown generally at 12, and a plurality of plant members, including an innermost plant member 14, an intermediate plant member 16, and an outermost plant member 18. Decorative skirts 20 and 22 are also included, the skirts nestingly fitting one over the other.

Figure 5:
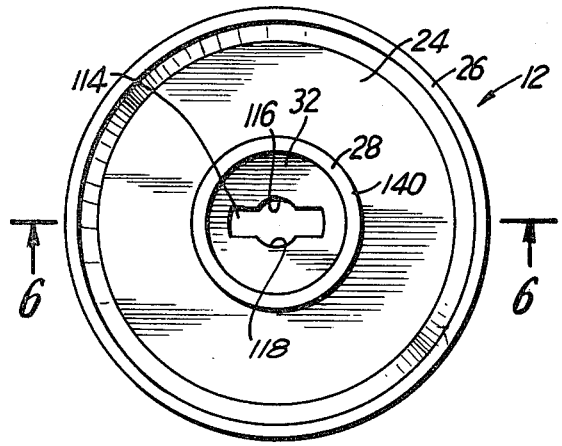
FIG. 5 is a top view of the base member of the artificial aquarium plant.
Figure 6:
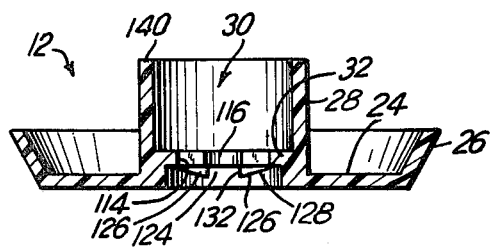
FIG. 6 is a cross sectional view taken along lines 6—6 of FIG. 5.
Figure 7:
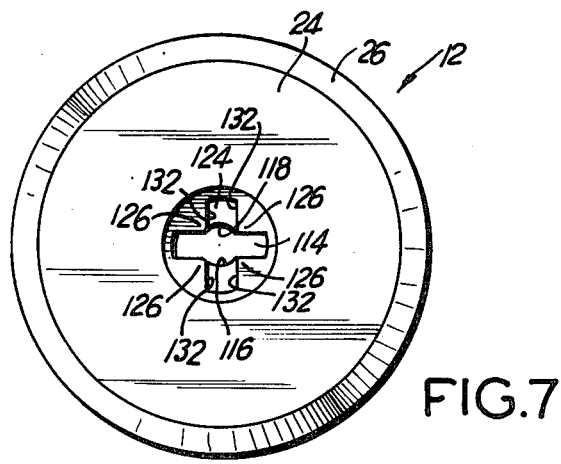
FIG. 7 is a bottom view of the base member.

The base member 12 is shaped as a saucer or dish and includes a bottom wall 24 with an upwardly extending, outwardly flared peripheral side wall 26 about the bottom wall 24. A centrally located hub 28 defines a receptacle opening 30 therein for receiving the nestingly interfitted plant members, as will hereinafter be described. The portion of the bottom wall enclosed within the hub 28 is recessed upwardly from the bottom wall 24 and includes a bottom wall section 32, as best shown in FIGS. 5-7.

The three plant members 14, 16, 18 are formed with each being gradually larger than the previous one, so that each plant member can nestingly fit within the next subsequent plant members. Each plant member includes a lower body portion from which upwardly extend branches which in turn support leaves thereon.

The innermost plant member 14 is formed slightly different than the other two plant members 16, 18. Specifically, the innermost plant member 14 includes two matingly engaging half sections 34, 36. The lower portion of each half section includes a substantially oval body portion 38, 40 from which upwardly extend the branches 42. Branches 42 radiate from the top of the oval shaped member in a fan like manner. In some cases, one branch can actually extend from another branch as shown by the branches 44.

The two half sections 34, 36 are interconnected by means of a male connecting pin 46 outwardly extending from the inner surface 48 of the oval shaped section 38, and a female section including a boss 50 extending from the inner surface 52 of the other section 36, the boss 50 being provided with a receiving bore 54. The male connecting pin 46 is received in the bore 54, preferably by means of a press fit, so that the confronting walls of the two oval shaped sections abut against each other to enclose the pin 46 therein. However, such press fit is not necessarily required. For convenience, the confronting walls are recessed with an outer peripheral frame wall 56 being provided around the recessed surface 48 and a corresponding frame wall 60 being formed about the recessed surface 52.

Downwardly extending from each oval shaped member is a leg section 62, 64. At the distal end of each leg section there is provided a transverse foot section 66, 68 which extends laterally on each side of the corresponding leg section 62, 64. It should be noted, that the distal edges 70 of each foot section is narrower than the upper portion thereof. When the two oval sections are mated, the two leg sections abut each other as do the foot sections and the upper branches so as to provide the composite innermost plant member 14.

At the upper distal end of each of the branches 42, 44 there are provided leaves 72. The leaves can either be integrally formed of one piece construction together with the branches and the associated oval member, or they can be snapped onto the branches as will hereinafter be described in connection with the other plant members.

Figure 3:
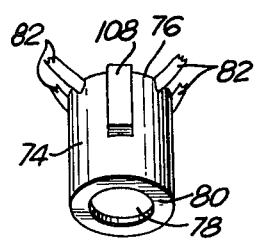
FIG. 3 is a fragmented perspective view of one body portion showing a particular arrangement for aligning the plant member into a desired orientation with another plant member.

The next plant member 16 forms the intermediate member in which the innermost plant member 14 nestingly interfits. This plant member 16 includes a tubular body portion 74 having an open top end 76 and an aperture 78 formed in the bottom wall 80 thereof, as can best be seen in FIG. 3. Upwardly extending and outwardly flared from the upper peripheral end 76 of the body portion 74 are branches 82. At the distal ends of the branches 82 are provided spear-like connectors 84 which are received in sockets 86 of the leaves 88. It should be noted, that the spear-like connections shown with regard to the intermediate body member 16 could also be provided for the uppermost plant member 14. Likewise, the single piece construction of the leaves and branches shown with respect to the uppermost body member 14 could also be provided for the intermediate plant member 16.

Figure 4:
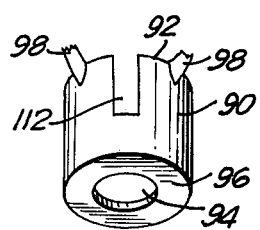
FIG. 4 is a fragmented perspective view of another body portion coming sequentially after that shown in FIG. 3 and showing an additional part of the aligning arrangement.

The outer plant member 18 includes a wider body portion 90 which has an open top end 92 and an opening 94 formed in the bottom wall 96 thereof, as can best be seen in FIG. 4. Outwardly flared and upwardly extending branches 98 are formed at the upper peripheral end 92 of the body portion 90. Spear-like connectors 100 are formed at the distal ends of the branches and are received within the sockets 102 formed in the leaves 104 so as to interconnect the leaves to the branches. Again, the leaves could be formed as a one piece construction as was shown above in connection with the innermost plant member 14. When spears and sockets are utilized, there is usually provided a snap force fit between the spear-like connector and the associated receiving socket in order to retain the leaf suitably in place at the end of its associated branch.

Figure 11:
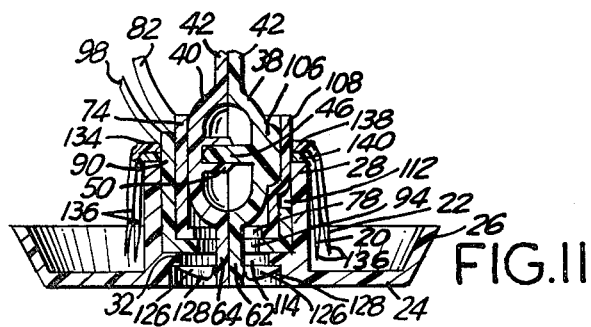
FIG. 11 is a fragmented cross sectional view taken through the assembled body portions of the aquarium plant.

It should be appreciated, that the body portion 90 of the outermost plant member 18 has a larger diameter than the body portion 74 of the intermediate plant member 16, which in turn has a larger diameter than the mated oval sections 38, 40 forming the composite body portion of the innermost plant member 14. As a result, a nesting interfitting relationship is achieved whereby the first plant member 14, when assembled, will have its oval body portion inserted into the body portion 74 of the intermediate plant member 16, which in turn can fit into the body portion 90 of the outermost plant member 18. Such nesting relationship is best seen in FIG. 11.

It should also be noted that preferably, the length of the branches 42, 44 of the innermost plant member 14 is higher than that of the branches 82 of the intermediate plant member 16, which in turn is higher than that of the branches 98 of the outermost plant member 18. Similarly, the innermost plant member 14 has its branches and stems closer related to the center of the plant, while the subsequent plant members are respectively further outwardly flared to a greater extent. In this manner, when all the sections are assembled, as shown in FIG. 1, a structure is achieved with various levels and layers of branches and leaves formed thereby. As shown in FIG. 2, the branches extending from some of the plant members 16, 18 may only extend peripherally about a portion of their respective body portions.

In many cases, in order to achieve a fine aesthetic appearance, it is necessary to have the branches and stems oriented. In order to achieve such oriented alignment, a protrusion 106 extends from the oval shaped member 38 of the innermost plant member 14. This protrusion 106 is received in the protruding channellike section 108 extending from the periphery of the body portion 74 of the next sequential plant member 16. Although the outer surface of the protruding channel 108 extends from the surface, there is formed therein an inner receiving channel 110 in which the protrusion 106 can slide. The protruding channel 108 in the intermediate plant member 16 is received within a keyway 112 formed in the body portion 90 of the outermost plant member 18.

When all of the plant members are assembled, alignment is achieved so that the branches and leaves are oriented to each other in a pleasing aesthetic appearance, even though they may only extend about a portion of the periphery of the body portion of the plant members.

In order to retain the assembled plant in a rigid condition for display and use, a transverse slot 114 is formed in the recessed bottom wall section 32 of the base member 12, as best shown in FIGS. 5-7. The slot is substantially elongated with centrally disposed arcuate portions 116, 118 on each side. This shape corresponds with the shape of the composite foot sections 66, 68. It should be noted, that slight bulges 120, 122 are formed on the opposing outer sides of the foot sections where the legs 62, 64 terminate into the feet 66, 68. Accordingly, the feet can be properly fitted into the slot 114 due to the arcuate portions 116, 118 thereof which receive the bulges 120, 122 to centrally align the feet in the slot 114, being guided into the slot 114 by the tapered edges 70 of each foot section.

A transverse seat portion 124 is formed into the bottom surface of the bottom wall section 32 of the base member 12 to receive the composite foot sections 66, 68 therein. The seat 124 is defined between the triangular sections 126 located between the slot 114 and the seat 124. Each of the triangular sections 126 includes an angled cam surface 128 which extends downwardly from the periphery of the recessed bottom wall section 32 and terminates in the vertical walls 132 on opposing sides of the seat 124.

Figure 8:
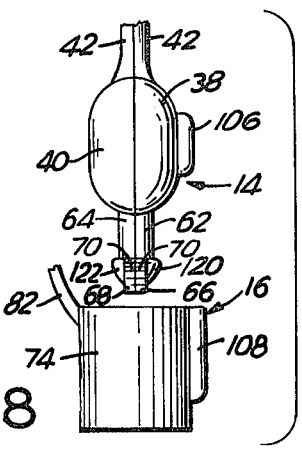
FIG. 8 is a fragmented exploded elevational view showing the interfitting of the innermost body portion into the next adjacent body portion.
Figure 9:
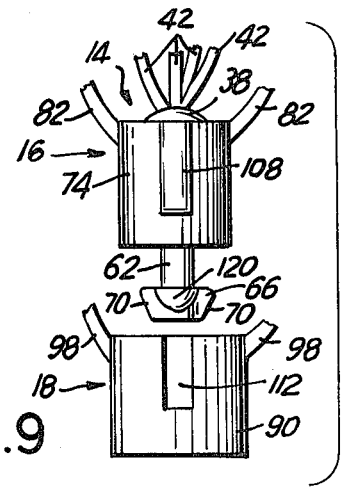
FIG. 9 is a fragmented exploded elevational view showing the interfitting of the assembly of FIG. 8 into an outermost body portion.
Figure 10:
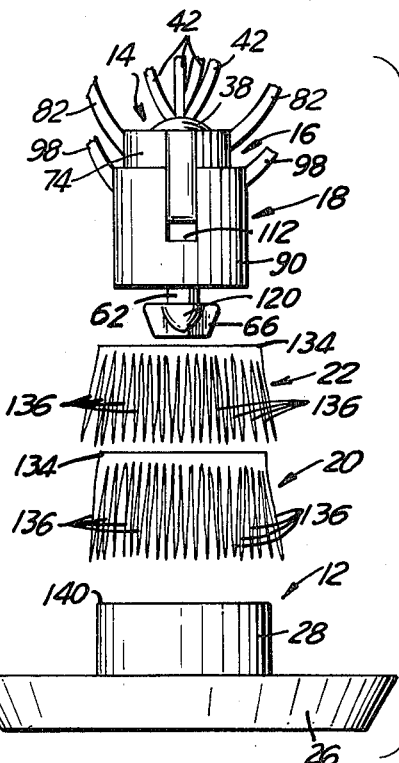
FIG. 10 is a fragmented exploded elevational view showing the interfitting of the assembly of FIG. 9 into the base member with the positioning of skirt portions for decorative purposes.

In assembling the plant members, as shown in FIGS. 8-10, initially the two sections 34, 36 forming the innermost plant member 14 are coupled together in the manner set forth above. The innermost plant member 14 is then properly aligned, as shown in FIG. 8, and interfitted into the intermediate plant member 16 with the leg and foot portions passing through the aperture 78 in the bottom wall 80 of the body portion 74 of the intermediate plant member 16, as shown in FIG. 9.

The two assembled plant members 14, 16 are then further inserted into the plant member 18 in a suitably aligned orientation, as shown in FIG. 9, while the foot and the leg portions pass through the aperture 94 in the bottom wall 96 of the body portion 90 of the outermost plant member 18, as shown in FIG. 10. The apertures 78 and 94 are substantially of the same size and preferably provide a slight interference fit for the foot portion passing therethrough so that a slight force is needed to push the foot through these apertures.

With the three body members 14, 16, 18 assembled so that they nestingly interfit with each other, as shown in FIG. 10, the leg and foot portions are inserted into the receptacle opening 30 of the hub 28 and then into the slot 114 provided in the base member 12 in the manner set forth above, whereby the assembled body portions will be received within the receptacle opening 30 defined by the hub 28. When the foot sections are extended beneath the bottom wall section 32 of the base member, the nestingly interfitted and aligned plant members 14, 16, 18 are twisted so that the foot sections will ride over the cam surfaces 128 provided by each triangular section 126 on the bottom wall section 32 of the base member. As the twisting continues, the foot sections will finally snap into and be firmly received in the seat 124 where it will remain lodged. The assembled plant members 14, 16, 18 will then be rigidly supported on the base member and will be held in place as shown in FIG. 11.

In order to provide suitable decoration, the skirt portions 20, 22 can be placed about the assembled body portions prior to their being placed into the base member 12. Each skirt includes a peripheral waist band 134 and outwardly flared, downwardly directed stems 136, which give the appearance of a grass skirt. The waist band 134 includes an inwardly directed lip 138 so as to permit one skirt to nestingly interfit within the other and to have the nestingly interfitted skirts rest on the upper edge 140 of the hub 28. It should be appreciated that although only two skirts are shown, others can be added, as desired. Similarly, although three plant members are shown, others could also be added.

The aquarium plant is typically formed of plastic material and the various parts of each member will be integrally molded. Preferably, the leaves are formed of low density polyethylene while the branch and body portions are formed of high density polyethylene, where low density polyethylene has a tendency to float in water. The base member is formed of high density polyethylene and the skirt portions can be formed of low density polyethylene. For smaller sized plants, preferably the entire upper plant member 14 is formed as a one piece construction entirely of low density polyethylene. However, for bigger plants, the innermost plant member could be formed with a snap fit arrangement between the branches and the leaves, whereby the leaves would be formed of low density polyethylene and the branches and body portion would be formed of high density polyethylene to reduce the tendency of the plant to float so that the plant will remain in a fixed position in the aquarium tank.

Once assembled, the material forming the plant will make it rigid and upstanding so that it can maintain its shape in a packaged condition. As a result, the plant can be retained assembled, as shown in FIG. 1, and placed in a package. Furthermore, the plant can stand upright on a shelf and maintain its attractiveness so that hobbyists will be able to select a suitable plant in accordance with their desires. At the same time, the plant will also retain its upright position once placed in an aquarium tank.

When placed in an aquarium tank, the base member 18 forms a dish which receives the conventional gravel and sand therein to provide anchorage for the artificial plants. The gravel and sand would fill onto and cover the bottom wall 24 and will be contained within the dish by the peripheral side wall 26.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:
1. An artificial aquarium plant comprising:
a base member;

a plurality of nestingly interfitting plant members supported by said base member;

each of said plant members including a body portion and branches upwardly extending from said body portion;

said body portion of an innermost plant member including two matingly engaging opposing section halves, each section half including a semi-oval portion with said branches upwardly extending therefrom;

a connecting pin extending perpendicularly from an inner surface of one semi-oval portion and a cooperating receiving bore provided in an inner surface of the other semi-oval portion, said connecting pin being disposed in said receiving bore to matingly join said section halves together;

coupling means for interconnecting said plant members with said base member, said coupling means including a leg depending from said body portion of said innermost plant member and passing through said body portions of the other plant members and into said base member; and locking means for removably securing said leg in said base member, said locking means including a transverse foot at a distal end of said leg and a slot provided in a bottom wall section of said base member for receiving said foot therethrough in a first aligned position of said foot, said foot being twist locked beneath said bottom wall section in a second misaligned position of said foot rotated from said first aligned position.

2. An artificial aquarium plant as in claim 1, wherein said leg and said transverse foot include two leg and foot portions, one of said leg and foot portions depending from said one semi-oval portion, and the other leg and foot portion depending from said other semi-oval portion, said two leg and foot portions matingly engaging each other when said section halves are matingly joined together.

3. An artificial aquarium plant as in claim 1, wherein said locking means further includes a seat provided on an underside of said bottom wall section and transverse to said slot for capturing therein said foot as it is twisted beneath said bottom wall section.

4. An artificial aquarium plant as in claim 3, and further comprising a cam surface on said underside of said bottom wall section extending between said slot and said seat for facilitating twisting of said foot into said seat and impeding twisting of said foot out of said seat.

5. An artificial aquarium plant as in claim 4, wherein said slot and said seat are elongated and substantially perpendicular to each other, said cam surfaces each including a section occupying a quadrant between said slot and said seat and having an inclined surface therealong and a sharp wall adjacent said seat.

6. An artificial aquarium plant as in claim 1, wherein said bottom wall section is upwardly recessed from the lower surface of said base member to receive said foot portion of said leg.

7. An artificial aquarium plant as in claim 1, and further comprising an upstanding hub surrounding said bottom wall section for defining a receptacle opening for receiving therein said nestingly interfitting plant members.

8. An artificial aquarium plant as in claim 1, and further comprising an aperture provided in a bottom wall of each body portion subsequent to the innermost body portion, said apertures being aligned in an assembled condition of said plant members for permitting passage therethrough of said foot portion of said leg.

9. An artificial aquarium plant as in claim 1, and further comprising aligning means on said body portions for interfitting each body portion into the next sequential body portion in an aligned orientation.

10. An artificial aquarium plant as in claim 1, wherein the body portion of the other plant members includes a tubular portion, the tubular portions of succeeding plant members sequentially fitting into each other, and the body portion of said innermost plant member fitting into the tubular portion of the next succeeding plant member.

11. An artificial aquarium plant as in claim 1, and further comprising spear-like connectors provided at distal ends of the branches, and leaves having sockets therein receiving a corresponding spear-like connector, so that said leaves are connected to the distal ends of said branches.

12. An artificial aquarium plant as in claim 1, wherein branches of respective plant members are sequentially shorter and more outwardly flared starting from an innermost plant member, so that said branches are longer and less outwardly flared on said innermost plant member.

13. An artificial aquarium plant as in claim 1, wherein the branches of at least some of said plant members extend upwardly in an outwardly flared direction from an upper peripheral edge of the respective body portion of that plant member.

14. An artificial aquarium plant as in claim 1, wherein the branches of at least some plant members are integrally formed with the respective body portion of that plant member in a one piece construction.

15. An artificial aquarium plant as in claim 1, and further comprising a skirt portion surrounding said plurality of nestingly interfitting plant members.

16. An artificial aquarium plant as in claim 7, and further comprising a plurality of nestingly interfitting skirt portions surrounding said plant members and supported on an upper edge of said hub.

17. An artificial aquarium plant comprising:
a base member;
a plurality of nestingly interfitting plant members supported by said base member;
each of said plant members including a body portion and branches upwardly extending from said body portion;
said body portion of an innermost plant member including two matingly engaging opposing section halves, each section half including a semi-oval portion with said branches upwardly extending therefrom;
a connecting pin extending perpendicularly from an inner surface of one semi-oval portion and a cooperating receiving bore provided in an inner surface of the other semi-oval portion, said connecting pin being disposed in said receiving bore to matingly join said section halves together;
coupling means for interconnecting said plant members with said base member; and
aligning means on said body portions for interfitting each body portion into the next sequential body portion in an aligned orientation, said aligning means including a keyway extending into said body portion of an outermost plant member, a protruding channel extending from the body portion of the next sequential plant member and interfitting into said keyway, and protrusion means extending from the body portion of the innermost plant member and interfitting into said protruding channel.

18. An artificial aquarium plant as in claim 17, wherein the body portion of said outermost and next sequential plant members includes a tubular portion, said tubular portions sequentially fitting into each other, and said body portion of said innermost plant member fitting into the tubular portion of said next sequential plant member.

19. An artificial aquarium plant as in claim 17, wherein the branches of at least some of said plant members extend from only a portion of the periphery of the respective body portion, and wherein said aligning means is arranged to cooperatively orient the branches in an overlying layered relationship.

* * * * *